United States Patent Office.

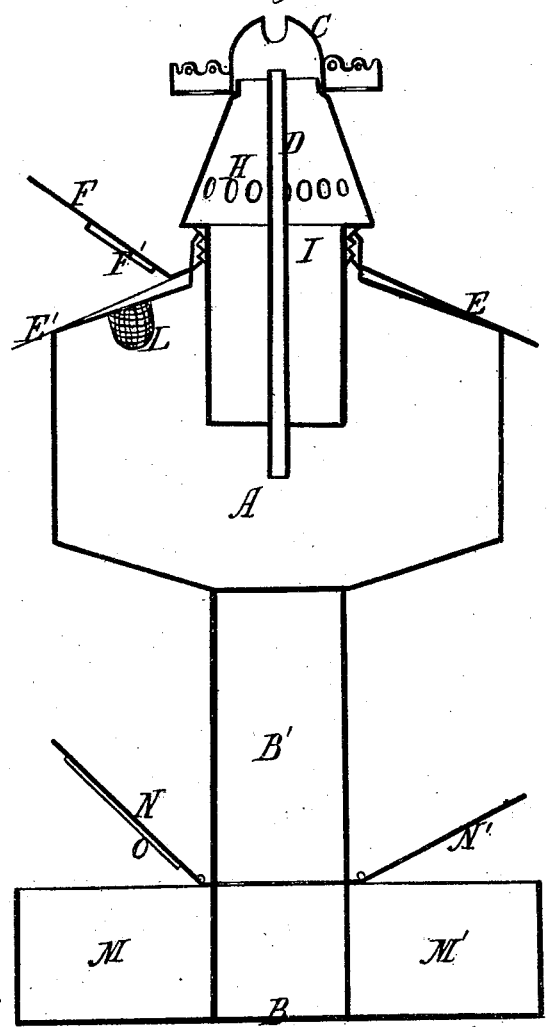

FRANCIS VANVOST SLEETH, OF KEOKUK, IOWA.

Letters Patent No. 102,168, dated April 19, 1870.

IMPROVEMENT IN LAMPS.

The Schedule referred to in these Letters Patent and making part of the same.

*To all whom it may concern:*

Be it known that I, FRANCIS VANVOST SLEETH, of Keokuk, Lee county, Iowa, have invented a new and useful Improvement in Safety-Lamps; and I declare the following to be a full, clear, and exact description thereof, reference being had to the accompanying drawings with their letters of reference, in which—

Figure 1 is a vertical section of my improved lamp.

This invention has for its object the making of a good safety-lamp; and it is made substantially as shown and set forth.

A is the bowl of the lamp for oil.
B is the base of the stand.
C is the burner-cap.
D, the wick-tube.
E is a reflector-plate.
F is a lid covering the opening L.

The top of the burner is somewhat like some in ordinary use, having chimney bearing a reflector, &c.

Around the base of the burner are perforations H, to admit air to the inside of the burner.

From the center part of the burner C descends an air chamber, I, around the wick-tube D, and extends downward into the bowl of the lamp A. The object of this is to interpose against the conduction of heat to the oil-chamber, thus forming a safety-lamp. This chamber I is closed at the bottom.

Around the base of the burner, on top of the lamp-bowl A, is a reflector-plate, E, which acts both with or without an upper reflector, borne on the chimney to throw the light outward.

At one side of the burner, at L, is an opening into the oil-chamber for filling by, without removing the burner.

A wire-gauze pocket is used in this to prevent any possible admission of flame.

Over the top of this opening is a part or lid, F, which fits down flush with the reflector-plate E, and forms part of it with E'.

This has a disk of rubber, F', on its under side, to close the opening L.

In the base of the lamp B is made one or two pockets for matches, &c., with lids N N'.

The under surface of N, at O, is made rough for striking matches on.

What I claim is—

A lamp, provided with the features of, first, an open air-chamber surrounding the wick-tube, and descending into the bowl, second, an opening, L, for filling the bowl by, third, a reflector-plate, E, on top of the bowl, fourth, a match-safe in the base of the lamp, all substantially as set forth, as a new or improved article of manufacture.

FRANCIS VANVOST SLEETH.

Witnesses:
A. RINKER,
SAMUEL JACOB WALLACE.